United States Patent [19]

Glover et al.

[11] 4,228,761
[45] * Oct. 21, 1980

[54] METHOD FOR COATING A POLYMERIC ARTICLE WITH A THERMOCHROMIC PAINT

[75] Inventors: Leon C. Glover, Los Altos; Eugene F. Lopez, Sunnyvale, both of Calif.

[73] Assignee: Raychem Corporation, Menlo Park, Calif.

[*] Notice: The portion of the term of this patent subsequent to Aug. 8, 1995, has been disclaimed.

[21] Appl. No.: 942,295

[22] Filed: Sep. 14, 1978

Related U.S. Application Data

[60] Division of Ser. No. 805,007, Jun. 9, 1977, Pat. No. 4,121,011, which is a division of Ser. No. 635,951, Nov. 28, 1975, Pat. No. 4,105,583, which is a continuation-in-part of Ser. No. 460,124, Apr. 11, 1974, abandoned.

[51] Int. Cl.$^3$ .................. C09K 3/00; C09D 5/26; G01K 11/14
[52] U.S. Cl. .................. 116/201; 73/150 R; 73/150 A; 73/356; 73/17 R; 106/308 B; 116/207; 116/216; 206/459; 206/484; 252/408; 428/349; 428/411; 428/539
[58] Field of Search .............. 252/408; 73/356, 17 R, 73/150 R, 150 A; 106/19, 308 B, 308 M, 308 S; 116/207, 201, 216; 428/539, 411, 347, 349; 206/459, 484

[56] References Cited

U.S. PATENT DOCUMENTS

| | | | |
|---|---|---|---|
| 1,924,793 | 6/1927 | Laske | 116/207 |
| 2,889,799 | 6/1959 | Korpman | 116/207 |
| 3,002,385 | 10/1961 | Wahl et al. | 116/207 |
| 3,236,651 | 2/1966 | Marks | 96/88 |
| 3,311,084 | 3/1967 | Edenbaum | 116/207 |
| 3,386,807 | 6/1968 | Edenbaum | 73/356 |
| 3,561,269 | 2/1971 | Seitz | 73/356 |
| 3,616,898 | 11/1971 | Massie | 116/207 |
| 3,744,295 | 7/1973 | Allinikov | 252/408 |
| 3,781,522 | 12/1973 | Borom et al. | 73/356 |
| 3,816,335 | 6/1974 | Evans | 252/408 |
| 3,980,581 | 9/1976 | Godsey, Jr. et al. | 252/408 |
| 4,105,583 | 8/1978 | Glover et al. | 252/408 |
| 4,121,011 | 10/1978 | Glover et al. | 252/408 |

FOREIGN PATENT DOCUMENTS

| | | | |
|---|---|---|---|
| 478140 | 1/1938 | United Kingdom | 252/408 |
| 835786 | 5/1960 | United Kingdom | 252/408 |

OTHER PUBLICATIONS

Day, Jesse H., Chemical Reviews, vol. 68, No. 6, pp. 649–657 (1968).
Cowling, J. E., et al. Ind. Eng. Chem., vol. 45, No. 10, pp. 2317–2320 (1953).

*Primary Examiner*—Teddy S. Gron
*Attorney, Agent, or Firm*—Lyon & Lyon

[57] ABSTRACT

An improved method for indicating the temperature to which a heat-deformable polymeric material coated with a thermochromic paint has been heated is disclosed. The improvement comprises the addition to the thermochromic paint of a non-thermochromic compound selected from the group consisting of the sulfates, hydrated sulfates and nitrides of boron, aluminum, tin, lead, arsenic, antimony, bismuth, zinc and phosphorus; the sulfides and hydrated sulfides of boron, aluminum, bismuth and phosphorus; the oxides and hydrated oxides of boron, arsenic, antimony and phosphorus and the salts, organic derivatives and free acids of the oxyanions of boron, arsenic, antimony and phosphorus.

11 Claims, No Drawings

METHOD FOR COATING A POLYMERIC ARTICLE WITH A THERMOCHROMIC PAINT

This is a division of application Ser. No. 805,007, filed June 9, 1977, now U.S. Pat. No. 4,121,011, which was a division of application Ser. No. 635,951 filed on Nov. 28, 1975, now U.S. Pat. No. 4,105,583, which was a continuation-in-part application of Ser. No. 460,124, filed Apr. 11, 1974, now abandoned.

BACKGROUND OF THE INVENTION

Thermochromic paints are used in a wide variety of applications, where it is desirable to monitor and control the temperature of a material through a heating process. One application for which thermochromic paints have been used, is in the heating of plastics to deform or shrink them with the assurance that the heating process will not cause permanent degradation of that particular plastic. One example for the use of thermochromic paints on plastic is on heat-shrinkable plastic sleeves which is used for connecting various types of conduits. The use of such heat-shrinkable sleeves are more fully described in U.S. Pat. Nos. 3,379,218 to Conde and 3,396,460 to Wetmore and assigned to the same assignee as the present invention. For this particular application, an irradiated thermoplastic, and often a polyolefin polymer or co-polymer which is subject to oxidative degradation is used. The heat-shrinkable plastic sleeve is placed over the conduits to be connected in an expanded state, and then heated, so it will shrink tightly over ends of the conduits, thereby connecting them.

For such connections, it has also been found beneficial to form a permanent bond between the heat-shrinkable material and the substrate over which it is shrunk. Thus, for many applications, an adhesive material is coated onto the interior walls of the heat-shrinkable sleeve so as to permanently bond the sleeve to the conduit. Adhesives which have been found particularly suitable for this type of application, are hot melt adhesives, as generally described in Lopez et al U.S. Application Ser. No. 291,542 filed Sept. 25, 1972 abandoned in favor of a continuation in part application which issued on Apr. 19, 1977 as U.S. Pat. No. 4,018,733; which is assigned to the same assignee as the present invention.

For this particular application, heat is required to both shrink the expanded plastic material and to melt the adhesive in order to permanently bond the plastic material to the substrate. It should be noted, that in many instances where this or a similar process is used to join conduits such as piping or electrical cables, it is under field conditions such as in a mine or on telephone lines. The heating unit may simply be a torch which will readily degrade the plastic if the temperature of the plastic is not monitored or controlled.

Thus, the use of thermochromic paints on the outer surface of a heat-shrinkable plastic has been found advantageous for indicating when a sufficient temperature has been reached to melt the adhesive on the interior surface, thereby bonding the plastic to the substrate, while assuring that the temperature of the plastic has not overheated to cause degradation. Various thermochromic paints, with different thermochromic pigments may be applied so as to change colors through a given temperature range. Many thermochromic pigments are compounds containing transition elements, such as vanadium, iron, cobalt, nickel, copper and chromium.

One particular thermochromic pigment which changes from yellow to red at about 300° C. is hydrated iron oxide of the general formula $Fe_2O_3 \cdot H_2O$. Thermochromic paints formulated with such a pigment, so as to change color at this temperature, have been found suitable for indicating when a plastic has been sufficiently heated to cause melting of a hot melt adhesive on its inner surface, yet not heated to such a degree to cause permanent degradation of the plastic.

Unfortunately, the use of thermochromic paints containing transition metal thermochromic pigments are in many instances themselves detrimental to the plastic upon which they are coated. More specifically, I have found that polyolefin materials, such as polyethylene, polyethylene co-polymers or terpolymers including ethylene/propylene, ethylene/ethylacrylate, ethylene/vinyl acetate or ethylene/propylene rubber may be adversely affected when coated with such paints and then heated. I have found that such plastics, when heated, tend to glow in spots, and to crater, and ultimately split when coated with paints containing such thermochromic pigments. In comparison, non-coated plastics heated to the same temperature do not degrade as readily. In effect, the thermochromic paint, which has been applied to prevent thermal degradation and excess heating, has been found to contribute to degradation in plastics sensitive to thermo-oxidative degradation.

Although the interreaction of the plastic and the thermochromic pigment is not fully understood, in the case of yellow iron oxide, upon heating, the following reaction is believed to take place:

As the heating progresses, the water of hydration is lost and the yellow color darkens to a red. The $Fe_2O_3$ remaining is believed to absorb radiant energy causing hot spots on the sleeve, manifesting itself in a glowing phenomenon. In addition, it is hypothesized that certain thermochromic pigments, containing transition metals, may react with the polyolefin plastic in some way, to catalyze the oxidation and degradation of the polyolefin plastic.

It is thus an object of this invention to provide an improved thermochromic paint which will indicate the temperature to which a plastic is heated, but will not contribute to the degradation of that plastic.

It is a further object of this invention, to provide a plastic article, whose temperature can be monitored so it can be heat processed under field conditions where precise heating methods are not available. It is a further object of the present invention to provide a thermochromic paint which will protect a plastic against degradation when it is heated to cause recovery over a substrate.

SUMMARY OF THE INVENTION

These and other objects are accomplished by providing an improved thermochromic paint, having as one of its ingredients, a non-thermochromic compound selected from the group consisting of the sulfates, hydrated sulfates and nitrides of boron, aluminum, tin, lead, arsenic, antimony, bismuth, zinc and phosphorus;

the sulfides and hydrated sulfides of boron, aluminum, bismuth and phosphorus; the oxides and hydrated oxides of boron, arsenic, antimony and phosphorus and the salts, organic compounds and free acids of the oxyanions of boron, arsenic, antimony and phosphorus.

Such a thermochromic paint additive neutralizes the detrimental effect that certain thermochromic pigments, containing transition metals, have upon plastics which are prone to oxidative degradation, such as polyolefins.

PREFERRED EMBODIMENT

Thermochromic paints are particularly useful as inexpensive heat indicators. Thus, where a plastic material must be heated in the field to form or shape it into a final product, the use of thermochromic paints on the surface of the plastic has been used as an inexpensive way of providing the operator with a means of ascertaining when sufficient heating has taken place. Such thermochromic paint coated plastics are particularly useful where the ultimate material to be heated is something other than the plastic and is not visible to the operator. Thus, where the plastic is in the form of a sleeve into which is inserted conduits to be connected, and heating of the plastic is required to activate an adhesive on the plastic's interior surface, it is impossible for the operator while heating the plastic to ascertain whether sufficient heat has been conducted through the plastic to activate the adhesive and bond it to the conduit. To take the guesswork out of such an operation, thermochromic paints have worked well for indicating when sufficient heat has been conducted through the plastic to activate the adhesive so that overheating does not occur.

Thermochromic paints comprise a thermochromic pigment, such pigments often being hydrated compounds containing an element of the transition metal series. Upon heating to a temperature sufficient to cause the loss of the water of hydration from the pigment, the coating changes color, indicating visually that a particular temperature has been reached. Examples of such thermochromic pigments are $Fe_2O_3.H_2O$ and $CuCO_3.Cu(OH)_2.H_2O$. Unfortunately, as previously discussed, such pigments may contribute to the degradation, of certain plastics which are prone to oxidative degradation such as polyolefins. We have found that particular non-thermochromic compounds, previously used as ingredients in flame retarded plastic formulations, when compounded with such a thermochromic paint, prohibit or neutralize the degradation caused by the thermochromic paint. More specifically, compounds selected from the group consisting of the sulfates, hydrated sulfates and nitrides of boron, aluminum, tin, lead, arsenic, antimony, bismuth, zinc and phosphorus; the sulfides and hydrated sulfides of boron, aluminum, bismuth and phosphorus; the oxides and hydrated oxides of boron, arsenic, antimony and phosphorus and the salts, organic compounds and free acids of the oxyanions of boron, arsenic, antimony and phosphorus, have been found beneficial to counteract the detrimental effect of the thermochromic pigment when coated onto a plastic subject to oxidative degradation. Particularly suitable oxides, sulfates, sulfides or nitrides are those of boron and phosphorus. Since these compounds must react with the plastic and/or the thermochrochromic pigment at elevated temperatures to prevent degradation, it will be understood that the compound may be added to the paint formulation. At elevated temperatures, such compound will usually dissociate, yielding the free oxide, sulfide, sulfate or nitride to prevent degradation of the plastic by thermochromic pigment.

Thus, in the case of boron compounds, not only may oxides of boron be used such as $B_2O_3$, but also the acids or salts of these oxides, such as boric acid or sodium borate, are suitable. Similarly, not only oxides of phosphorus may be used, but also the various oxy acids of phosphorus, including the various forms of phosphoric, polyphosphoric and phosphorus acids and salts thereof. In addition, organic phosphates and phosphites, may be added to the paint formulation, such as tricresyl phosphate. Another ingredient which has been found particularly suitable is antimony oxide.

The level of additive used in the paint formulation may vary widely. In the case of a coating having approximately 14% pigment binder concentration of which 10% is a thermochromic pigment, 0.5 to 15% of the compound additive of this invention has been found suitable to sufficiently prevent the detrimental effect of the thermochromic pigment on the plastic. Although higher levels may also be used, the use of excess compound additive in proportion to thermochromic pigment will generally dilute the thermochromic effect of the paint, increase the cost, and exhibit little further effectiveness. The preferred range of compound additive is from 3 to 7% of a coating formulation of which 10% thermochromic pigment makes up a 14% pigment-binder concentration. The thermochromic paint of the invention is illustrated from the following examples.

EXAMPLE I

A thermochromic paint masterbatch of the following formulation was utilized.

| | |
|---|---|
| Ethylene/Ethyl Acrylate Copolymer | 2.0 |
| 1,1,1 trichloroethane | 59.4 |
| Toluene | 22.8 |
| $TiO_2$ | 5.0 |
| $Fe_2O_3 . H_2O$ Yellow thermochromic pigment | 5.0 |
| Additives (thickeners, surface active agents and anti oxidants) | 2.0 |

Lots were made up on a 500 to 1000 gram basis by grinding the ingredients in a ball mill for 12 hours or more; all of the mixtures were evaluated on a polyethylene heat-shrinkable sleeve. A piece of sleeve (usually 18" long) which was coated with a hot melt adhesive as disclosed in Lopez et al U.S. Patent Application Ser. No. 291,542, filed Sept. 25, 1972, abandoned in favor of a continuation in part application which issued on Apr. 19, 1977 as U.S. Pat. No. 4,018,733; was sprayed with the thermochromic paint over the opposite surface. The paint was allowed to dry. For the screening study an aluminum pipe (o.d.=2.5", wall=0.25") was used as a test mandrel or substrate. For the test one layer of aluminum foil was wrapped around the pipe to facilitate the removal of the sleeve/adhesive layer after shrinking. The sleeve was then wrapped around and a metal rail was slid over the two lips of the edge closure. A torch was used on a propane tank with a regulator set at 4 psi. The flame was lit and the torch valve was opened wide to give a blue/yellow flame 10–12 inches long. Timing was begun when the flame touched the sleeve. After each test the old sleeve was cut off the mandrel and the mandrel was cooled to room temperature before the next test. The results of the tests with and without a coating and with a coating with and without 4% additive compounds in the coating are summarized in Table I.

TABLE I

| Additive | Time to Crater/ Split (Minutes) | Glow |
|---|---|---|
| No coating on sleeve | 3 | No |
| Coating without additive | 2–2½ | Yes |
| Coating without thermochromic pigment | 5 | No |
| Sodium Borate | 3–3½ | No |
| Ammonium Polyphosphate | 3½ | No |
| Tricresyl Phosphate | 3½ | No |
| $Sb_2O_3$ | 3½ | No |
| $B_2O_3$ | 4½ | No |
| Barium Metaborate | 5 | No |
| Boric Acid* | 6 (craters only) | No |

*No splitting or glowing after 9½ minutes.

From Table 1, the polyethylene plastic without the coating cratered and split at about 3 minutes. When a standard thermochromic coating was applied containing a $Fe_2O_3.H_2O$ thermochromic pigment it took slightly less heating to cause the plastic to crater and split, but more importantly, pronounced glowing of the plastic material was observed. Glowing generally indicates that the plastic is being permanently degraded even if cratering or splitting does not occur.

Deletion of the thermochromic pigment from the paint formulation proved effective in substantially increasing the time to which the plastic could be subjected to heating. From this it was deduced that the thermochromic pigment was the cause of the increased plastic degradation.

All of the additives in accordance with this invention improved the thermal stability of the coated plastic. In the case of boric acid, no splitting or glowing was discerned after 9½ minutes of heating while cratering occurred only after 6 minutes.

EXAMPLE II

A thermochromic paint as in Example I was evaluated on a different lot of polyethylene plastic with and without various additives at the 4% level. The coated plastic was tested as per Example I, the results of which are summarized in Table II.

TABLE II

| Additive (at 4% level) | Time to Crater (Minutes) | Glow |
|---|---|---|
| Thermochromic paint without additive | 2 | Yes |
| No coating | 2½ (4 min. to total failure) | No |
| Sodium phosphate . 12 $H_2O$ | 3 | Slight |
| $BPO_4$ | 3 | Slight |
| BN | 3½ | No |
| Aluminum Sulfate . 18 $H_2O$ | 3½ | Slight |
| $As_2O_5$ | 3½ | No |
| Sodium Arsenate | 4½ | No |

From these results it can be seen that sulfates and nitrides as well as oxides are useful in extending the heating time of the plastic.

EXAMPLE III

A thermochromic paint master batch of the following formulation was utilized.

| | |
|---|---|
| Ethylene/Ethyl Acrylate Copolymer | 2.0 |
| 1,1,1 Trichloroethane | 59.4 |
| Toluene | 22.8 |
| Additives (thickeners, surface active agents, antioxidants) | 2.0 |
| Hydrated Copper Carbonate Thermochromic pigment | 7.0 |
| $TiO_2$ | 7.0 |

The coating was tested as per Example 1, the results of which are summarized in Table III.

TABLE III

| Additive | Time to Crater/ Split (Minutes) | Glow |
|---|---|---|
| Coating without Additive | 3 | Yes |
| $Sb_2O_3$ | 3 | No |
| Barium Metaborate | 4½ | No |
| Boric Acid | 6 | No |

Table III indicates that the additive compounds of this invention are effective to counteract the detrimental effect of a number of thermochromic pigments including hydrated copper carbonate.

What is claimed is:

1. In a method for indicating the temperature to which a heat-deformable polymeric material subject to oxidative degradation is heated comprising the step of applying a thermochromic paint thereon, the thermochromic paint containing a thermochromic pigment comprising a metallic compound, the improvement comprising the step of inhibiting degradation of the polymeric material by adding to the paint a non-thermochromic compound in amounts effective to inhibit degradation of said polymeric material by the thermochromic pigment, said non-thermochromic compound selected from the group consisting of the sulfates, hydrated sulfates and nitrides of boron, aluminum, tin, lead, arsenic, antimony, bismuth, zinc and phosphorus; the sulfides and hydrated sulfides of boron, aluminum, bismuth and phosphorus; antimony; the salts, organic derivatives and free acids of the oxyanions of boron, arsenic, and antimony; and the oxides, salts and organic derivatives of the oxyanions of phosphorus.

2. In a method for indicating the temperature to which a heat-deformable polymeric material subject to oxidative degradation is heated comprising the step of applying a thermochromic coating paint thereon, said coating paint containing a thermochromic pigment comprising a metallic compound, the improvement comprising the step of inhibiting degradation of the polymeric material by adding a non-thermochromic compound in amounts effective to inhibit degradation of said polymeric material by the thermochromic pigment, said non-thermochromic compound selected from the group consisting of the oxides and hydrated oxides of phosphorus and the salts, organic derivatives and free acids of the oxyanions of phosphorus.

3. The method of claim 1 or 2 wherein the thermochromic pigment is a transition metal compound.

4. The method of claim 3 wherein the thermochromic pigment is a hydrated iron oxide.

5. The method of claim 3 wherein the thermochromic pigment is a hydrated copper carbonate.

6. The method of claim 1 or wherein said non-thermochromic compound comprises from 0.5 to 10% by weight of the paint composition.

7. The method of claim 6 wherein said non-thermochromic compound comprises from 3 to 7% of the paint composition.

8. The method of claim 1 wherein the non-thermochromic compound is an oxygen containing boron compound selected from the group consisting of boron trioxide, borate salts, metaborate salts or boric acid.

9. The method of claim 1 wherein the non-thermochromic compound is an oxygen containing phosphorus compound selected from the group consisting of salts, and organic derivatives of phosphate and phosphite anions.

10. The method of claim 1 wherein the non-thermochromic compound is selected from the group consisting of antimony oxide and arsenic pentoxide.

11. The method of claim 1 or 2 including the step of heating the polymeric material until the thermochromic pigment changes color.

* * * * *